CAPACITY-EXCEEDING INDICATING MEANS FOR COMPUTERS

Filed April 13, 1962 3 Sheets-Sheet 1

JNVENTORS
Ralf Walther
Helmut Tangenberger
Lutz [illegible]
By
OSTROLENK. FABER. GERB & SOFFEN-ATTY'S

CAPACITY-EXCEEDING INDICATING MEANS FOR COMPUTERS

INVENTORS:
ROLF WALTHER
HELMUT LANGENBERGER
KURT RÖHRER

By
OSTROLENK, FABER, GERB & SOFFEN
ATTORNEYS

CAPACITY-EXCEEDING INDICATING MEANS FOR COMPUTERS

Filed April 13, 1962 3 Sheets-Sheet 3

INVENTORS:
ROLF WALTHER
HELMUT LANGENBERGER
KURT RÖHRER

By

OSTROLENK, FABER, GERB & SOFFEN
ATTORNEYS

United States Patent Office 3,170,625

Patented Feb. 23, 1965

3,170,625

CAPACITY-EXCEEDING INDICATING MEANS FOR COMPUTERS

Rolf Walther, Gerstetten, Wurttemberg, and Helmut Langenberger and Kurt Röhrer, Niederstotzingen, Wurttemberg, Germany, assignors to Walther-Buromaschinen G.m.b.H., Gerstetten, Wurttemberg, Germany

Filed Apr. 13, 1962, Ser. No. 187,357

Claims priority, application Germany, Apr. 19, 1961, W 29,833

5 Claims. (Cl. 235—60.15)

This invention relates to computers, and more particularly to a capacity-exceeding indicating device for computers capable of performing addition, subtraction, multiplication and division, and further having print-out facilities wherein the indicating device provides for the automatic interruption of a division operation when the capacity of the quotient in the computer quotient register is exceeded, and simultaneously therewith prints a symbol indicative of the capacity-exceeding condition.

In computing machines of the prior art capable of performing the aforementioned operations, the division operation takes place in a fully automatic manner, once the dividend and the divisor have been indexed into the computer by depressing the appropriate keys, and subsequently thereto, by depressing the division actuation key. However, before initiating a division operation, the decimal digit positions of the factors to be employed in the operation must be placed into the machine in such a manner that the range selected for the quotient avoids exceeding the capacity of the quotient register.

No possibility for the simultaneous storage of several quotients exists, and in the present instance is not feasible, since the storage of plurality of quotients, each having different decimal positions, would, therefore, be recognized by the computer simply as the total of the accumulated quotients with incorrect decimal positions, and thereby result in erroneous computations. If, during such accumulation-computation operations, such an exceeding of computer capacity of the quotient occurs, there is presently no other choice but to clear the entire computation from the machine and repeat the computation. This requires special attention on the part of the operator who must reduce the total number of decimal digit positions of all quotients by one or several digits. This would mean that the position of the decimal point of the quotient must be shifted to the right by one or more digit positions in order to stay within the quotient capacity.

In prior art devices, this is accomplished by shifting the division tabulator member which determines the position of the number to be divided in the totaling register as well as the position of the quotient in the quotient register. This operation, however, is based on the premise that an exceeding of the computer capacity during the division operation is recognizable, or in machines with printing facilities, is visibly observable through the control of the printing symbols.

In prior art machines capable of performing addition, subtraction, multiplication and division, and equipped with visibly readable registers, recognition of the exceeding of computer capacity, while possible, is a tedious operation, and thereby requires increased alertness on the part of the machine operator. Reliance upon human observation thereby greatly increases the probability of occurrence of erroneous computations.

In prior art computers which are not equipped with such visibly readable register means, the danger of occurrence of erroneous computations due to the exceeding of machine capacity is even greater than that of machines having visibly readable registers, since exceeding of capacity may be overlooked by the operator due to lack of any indicating means to provide any readable output indicative of an erroneous computation.

The instant invention eliminates the above disadvantages by providing automatic interruption of the division operation upon exceeding of machine capacity, and further clears the machine of the divisor and prints out the divisor and remainder of the portion of the division operation already performed, together with a symbol which is indicative of the fact that the capacity of the machine has been exceeded.

A brief example will first be given by way of a sample calculation performed by a computer device having a quotient capacity of eight decimal digit positions. The mathematical operation is as follows:

256,846,523.46÷365.25

The resulting quotient for the above operation is 703,207.45

In this example, the eight decimal position capacity of the quotient is fully used. However, it should be noted that the computer capacity has not been exceeded.

As a further example, assume that the division to be performed is:

456,846,523.45÷365.25

The result of this operation is (1), 250,777.61

This quotient exceeds machine capacity as shown by the bracketed (1) which has exceeded machine capacity and, therefore, is not visible to the operator, and, further, has not been imprinted by the computer printing facility. If, however, the decimal point of the quotient is shifted to the right one digit position, then the quotients in both examples given above can no longer be stored by the computer.

The following calculation shows how a computer equipped in accordance with the arrangement of the instant invention reacts to the latter example given above. The dividend 456,846,523.45 remains indexed in the computer keyboard. The divisor 356.25 is printed by the printing facility together with a symbol indicative of the fact that the computer quotient capacity has been exceeded. The remainder 550.71 is also printed together with a symbol indicative of the fact that the computer quotient capacity has been exceeded. The quotient 100,000.00 remains in the machine and will be cleared upon initiation of the next computer operation.

The device of the instant invention is comprised of an apparatus which is arranged to actuate a lever for control of the symbol indicative of the fact that machine capacity has been exceeded. The apparatus further provides for imprinting of the divisor and the remainder simultaneously with the printing of the capacity-exceeding symbol.

It is, therefore, one object of this invention to provide an apparatus for automatically interrupting a computer division operation when the quotient capacity of the computer has been exceeded.

Another object of this invention is to provide apparatus for recognizing the exceeding of a computer quotient capacity during a division operation, and which simultaneously therewith prints a symbol indicative of this condition together with automatic stoppage of the division operation in process.

These and other objects of this invention will become apparent when reading the following description and accompanying drawings, in which.

Figure 1:
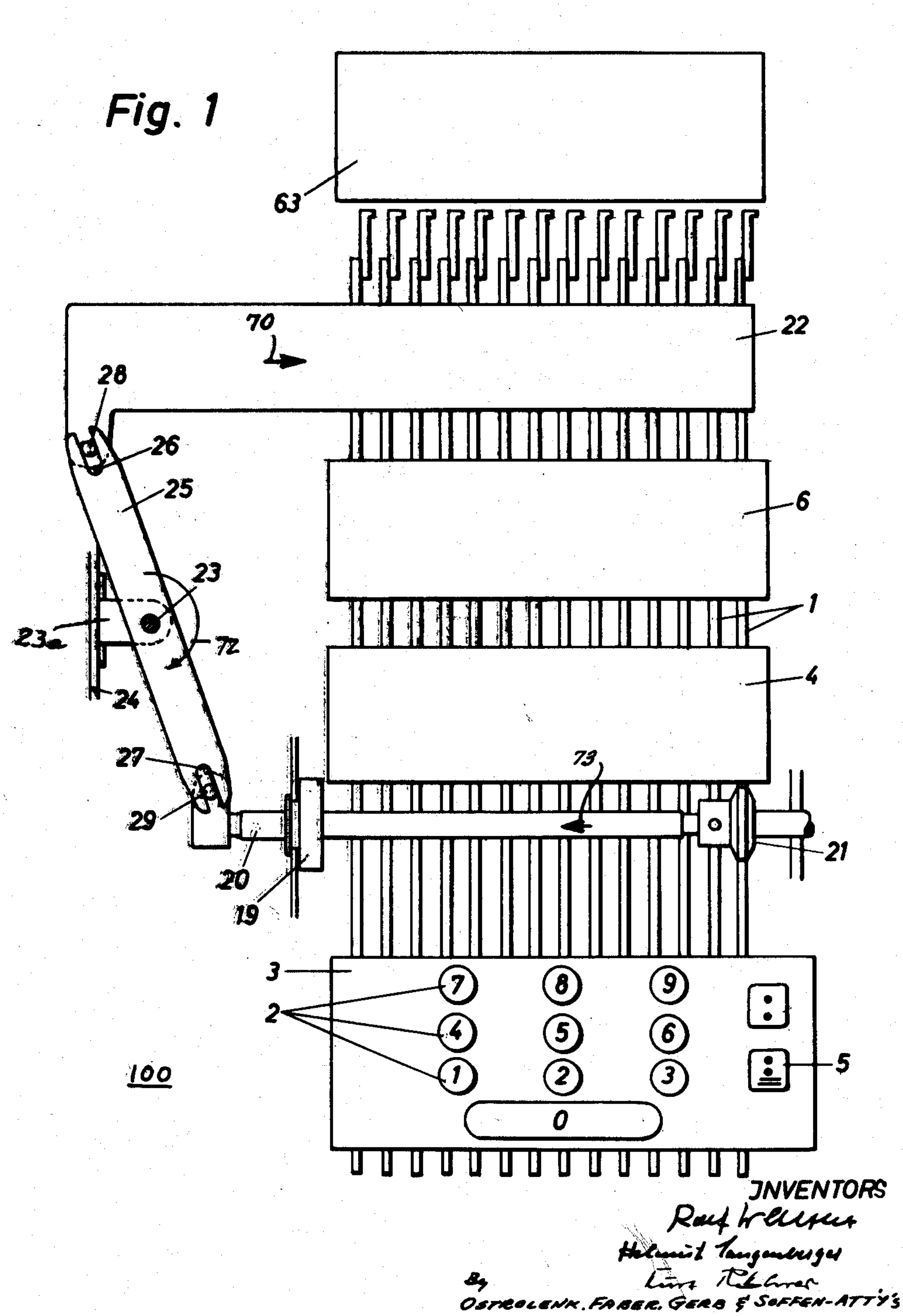
FIGURE 1 shows a computing machine with portions thereof shown in diagrammatic form and which employs the capacity-exceeding recognition device of the instant invention.

Referring now to the drawings, FIGURE 1 shows a computer 100 which is comprised of a switching mechanism having parallel cog racks 1 wherein one cog rack is associated with each decimal digit position. A keyboard 3 is provided which has a ten-key set 2 for setting up any of the decimal numbers "zero" to 9, and further includes operation keys 5 for performing machine operations such as adding, subtracting, multiplying and dividing.

The keyboard and accompanying actuating mechanisms (not shown) are well known in the art, and since the particular arrangement employed lends no novelty to the instant invention, the mechanism has not been described or shown in detail, whereas the devices for switching on, functioning and interconnecting elements which are integrally connected with the capacity-exceeding indicating means of the invention, in particular, the automatic interruption of divisions when the capacity of quotient register 4 is exceeded, are set forth below in detail.

Figure 2:
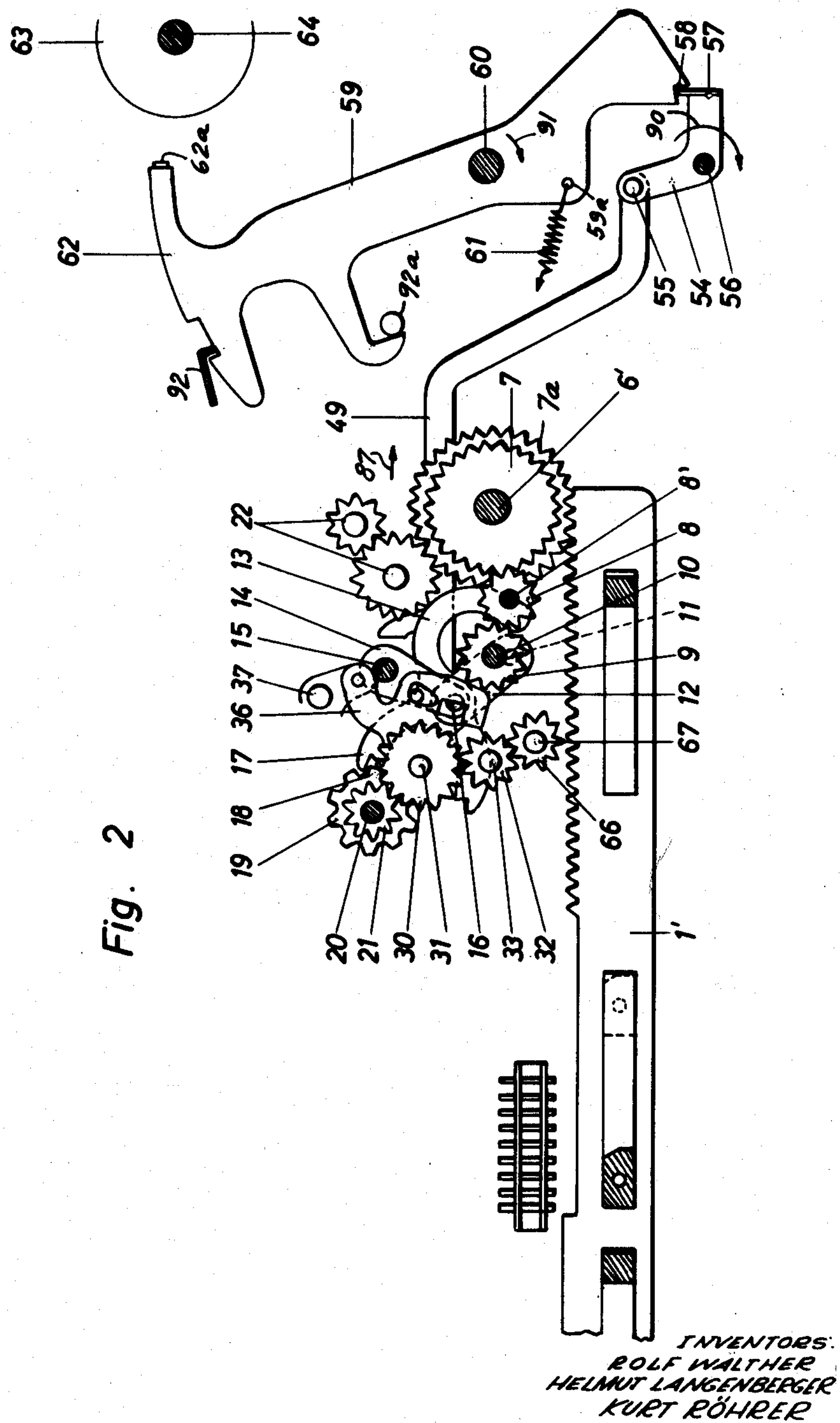
FIGURE 2 is a side plan view of the quotient mechanism of FIGURE 1, showing the control drive portion thereof in greater detail.

The performance of a division operation takes place as follows:

When the second number (which is the divisor) is indexed into the computer by keys 2, and when the corresponding key of the operation keys 5 is depressed for initiation of a division operation, the appropriate cog rack such as the cog rack 1′ shown in FIGURE 2 urges the cogwheel *7a*, pivoted upon the register axle 6′, to be rotated an amount equal to the decimal digit indexed into the machine at that digit position. Register axle 6′ is an element of the register 6 shown diagrammatically in FIGURE 1.

The rotation of cogwheel *7a* is imparted to axle 6′ which, in turn, rotates cogwheel 7 through a like angle. The rotation of cogwheel 7 is transferred through a cogwheel 8, pivotally mounted to axle 8′, to a cogwheel 9 which is rotatably mounted upon axle 10. An eccentrically mounted pin 11 is positioned upon cogwheel 9 and is further pivotally connected to a connecting bar 12 which engages a shift fork member 13 and a rocking arm member 14 by means of a pin or bolt 16.

Rocking arm 14 is rotatably mounted to a shaft 15 and its connection to connecting bar 12 by means of pin 16 causes connecting bar 12 to exert a pushing motion upon shift fork 13 under control of the rotating cogwheel 9 and the eccentrically mounted pin 11 secured thereto. This pushing motion causes the switching nose 17 of shift fork 13 to engage the teeth 18 of switch 19 whereby the amount of rotation of switch wheel 19 is controlled by the amount of rotation of register axle 6′. It is necessary to provide a switching nose 17 in each digit position of the device in order to appropriately set the switch gear 21, as it shifts one position to the left during the division operation until completion thereof.

The switch wheel 19 rotates a switch shaft 20 (note also FIGURE 1) which is mounted so as to be slidable along its longitudinal axis, and which has a cogwheel 21 secured near its right-hand end. The cogwheel 21 rotates an amount representative of the magnitude of the divisor which is being divided into the dividend. This rotation is meshed through cogwheel 21 and gear 30 to gear 32, which rotates through greater than one revolution if the capacity of the quotient is exceeded. It is immaterial whether this takes place in a step by step rotational manner, or in one complete rotational sweep, as this is dependent strictly upon the type of computational facility employed and basically lends no novelty to the device of the instant invention. The movement of the switch shaft 20 along its longitudinal axis is controlled by the movement of main mechanism 22 which steps in the direction of the arrow 770. Main mechanism 22 comprises the main assembly of the computer, and suffice it to say that its function relative to the understanding of the instant invention is that of performing the shifting operation during a division operation.

When the main mechanism moves in the direction shown by arrow 70, this movement is imparted to the switch shaft 20 in the following manner:

The left-hand end of the main mechanism 22 has a pin 28 which slidably engages an elongated slot 26 of intermediate lever 25. Intermediate lever 25 is pivoted about pivot pin 23 at a point intermediate its ends. The pivot pin is secured to the left side wall 24 of the computer housing by means of a clamp 23[a] which is affixed to the side wall 24 in any well-known manner.

The opposite end of intermediate lever 25 has an elongated slot 27 which slidably engages a pin 29 secured to the left-hand end of switch shaft 20.

When main mechanism 22 moves in the direction shown by arrow 70, this translational motion is imparted to intermediate lever 25 by pin 28 which causes lever 25 to rotate clockwise, as shown by arrow 72, which rotational motion is imparted through slot 27 and pin 29 to switch shaft 20. This causes switch shaft 20 to move in the direction shown by arrow 73, ultimately causing cogwheel 21 to engage intermediate gear wheel 30 of the quotient register 4, which gear wheel 30 is secured to rotatable shaft 31. This position (see FIGURE 1) is the position attained by the computer mechanism when the most significant digit of the quotient is being formed.

Figure 3:
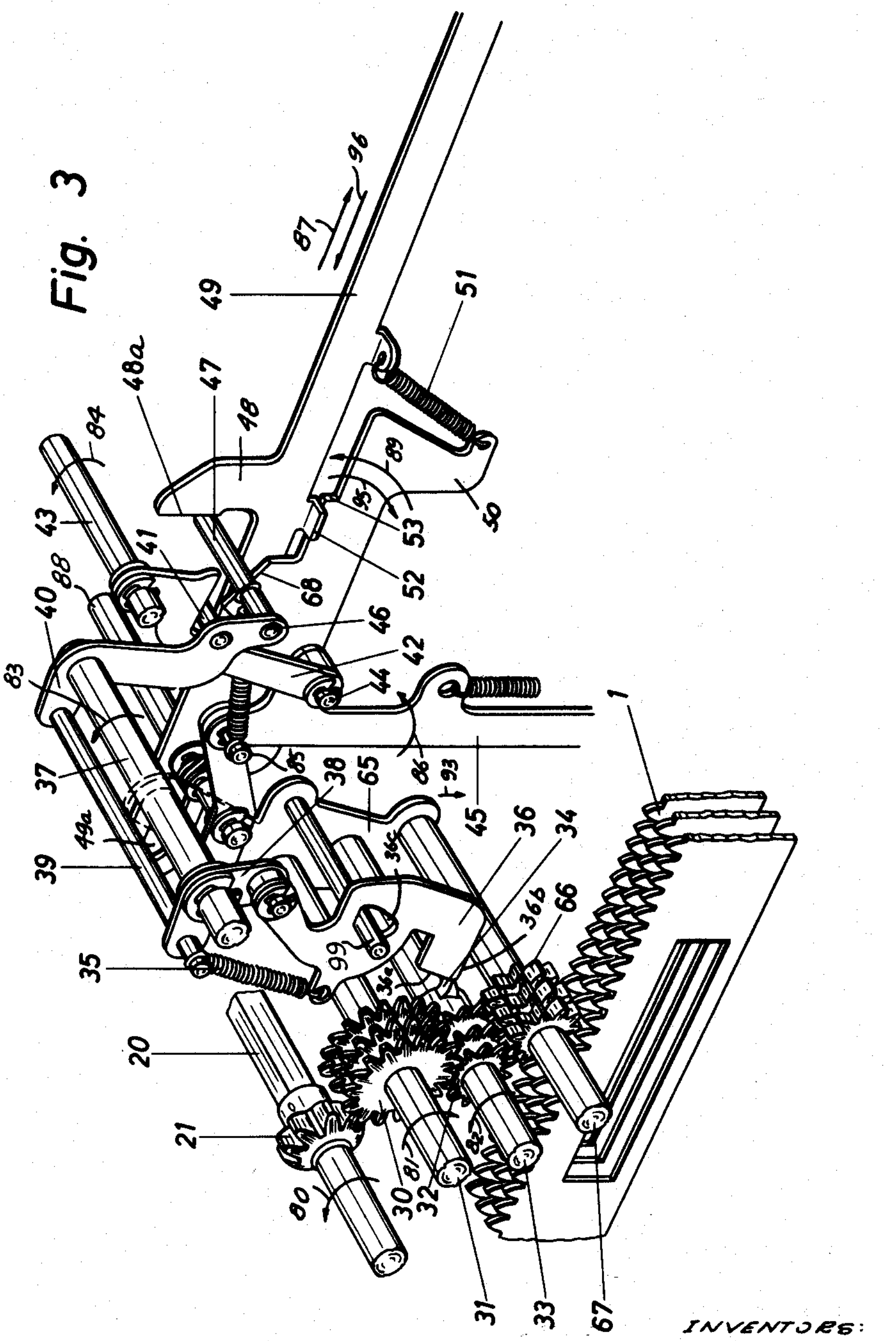
FIGURE 3 is a perspective view of another portion of the quotient mechanism of the computer of FIGURE 1, and further shows the quotient mechanism driving element.

Recognition of the condition that the quotient-storing capacity exceeded takes place as follows:

With reference particularly to FIGURE 3, the main mechanism 22 (see FIGURE 1) now is in the position shown in FIGURE 1 so that the cogwheel 21 is operating upon the most significant decimal digit position. The division computation is performed by engagement of the cogwheel 21 with the intermediate gear 30 mentioned previously which is mounted to rotatable shaft 31. The shaft 20 rotates in the counterclockwise direction, as shown by arrow 80, causing the gear 30 and shaft 31 to rotate in the clockwise direction, as shown by arrow 81. Intermediate gear 30 meshes the transfer gear 32 mounted to shaft 33, causing gear 32 and shaft 33 to rotate in the counterclockwise direction, as shown by arrow 82.

A lifting cam 34, which is positioned and secured to shaft 33 and rotatable therewith, abuts the left-hand edge *36a* of movable member 36. A rotation of transfer gear shaft 33 of greater than one complete revolution is indicative of insufficient storage capacity in the computer, and causes the lifting cam 34 to abut the lower edge *36b* of slidable member 36, causing member 36 to be lifted upward in substantially the vertical direction. The upper end of slidable member 36 is pivotally connected to a substantially L-shaped cross-bar member 38 which is pivotally mounted to a rotatable shaft 37. A spring member is connected between an eyelet on slidable member 36 and a shaft 39, secured to one end of L-shaped cross-bar member 38, acting to urge the member 36 towards the clockwise direction of rotation about its pivot point. The upward vertical movement of lifting cam 34, however, causes rotation in the reverse direction to take place, resulting in the counterclockwise rotation of cross-bar member 38 and shaft 37 in the direction shown by arrow 83.

A second substantially L-shaped member 40 which is secured to the opposite ends of shafts 37 and 39 is thereby under control of counterclockwise rotation of shaft 37 to rotate in the same direction. A pin 41 provided in an eyelet of L-shaped switch lever member 40 is thereby pivoted counterclockwise about its pivot means (shaft 37) moving this pin so as to abut rocking lever 42 which is pivotally mounted to a shaft 43. With the slidable engagement of pin 41 against the lower edge of rocking lever 42, the lever 42 is rotated in the counterclockwise direction about shaft 43, as shown by arrow 84, which rotational motion is transferred to a switching bar member 45 which is pivotally connected to a lower end of rocking lever 42 by means of pin 44. This causes switching bar 45 to pivot in the counterclockwise direction about its pivot pin 85, as shown by the arrow 86. The motion of switching bar 45 initiates the next step in the division operation which continues in a well-known manner under control of such division mechanisms well-known to the prior art, and for this reason, any detail thereof has been omitted from this description for reasons of clarity.

Simultaneously with initiation of rotation of switching bar 45, a second pin 47 mounted to switch lever member 40 by means of an eyelet 46 abuts against the left-hand edge 48*a* of a projection 48 provided on connecting bar 49, causing connecting bar 49 to move in the direction shown by arrow 87. Connecting bar 49 is able to move in the direction shown by arrow 87, due to a lost-motion arrangement which exists between the elongated slot 49*a* provided at the left-hand end of connecting bar 49 and the shaft 88 which extends through the elongated slot 49*a*.

A switch ratchet member 50 is also pivotally mounted to shaft 88, but is restrained from any translational movement relative to shaft 88 by virtue of the mounting employed, as can be seen in FIGURE 3. With the movement of connecting bar 49 in the direction of arrow 87, a flange 52 provided on connecting bar 49 moves in the direction of arrow 87, and relative to switch ratchet member 50, to a position whereby the left-hand edge of flange 52 moves beyond the notch 53 provided on switch ratchet member 50. When this position is achieved, switch ratchet member 50 rotates in the counterclockwise direction about its pivot point 88, as shown by arrow 89, due to the influence of spring member 51 connected between connecting bar 49 and the right-handmost end of switch ratchet member 50. The counterclockwise movement of switch ratchet member 50 causes the left-hand edge of flange 52 to abut the notch 53 of switch ratchet member 50.

As shown in FIGURE 2 of the drawings, the right-handmost end of connecting bar 49 is pivotally mounted to an angle lever member 54 by means of a pivot pin 55. Angle lever member 54 is mounted for rotational movement about a shaft 56, and its rotational movement is under control of the connecting bar member 49. Thus, with movement of connecting bar 49 in the direction of arrow 87, angle lever member 54 rotates in the clockwise direction about shaft 56, as shown by arrow 90. This clockwise rotation moves the flanged portion 57 of angle lever 54 out of engagement with a cooperating notch 58 provided at the lower end of capacity-excess lever member 59.

Capacity-excess lever 59 is mounted to pivot about a shaft member 60, and is biased towards rotation in the clockwise direction, as shown by arrow 91, about shaft 60 under control of a spring member 61 having one of its ends secured to capacity-excess lever 59 at aperture 59*a*, and being connected at its opposite end to the computer housing in any well-known manner. Therefore, upon the clockwise rotation of angle lever member 54, excess-capacity lever 59 is no longer restrained from clockwise rotation in the direction of arrow 91, and under control of spring means 61, is enabled to rotate in the clockwise direction, causing the character type 62*a* mounted to the upper part of excess-capacity lever 59, which upper part constitutes the printing hammer 62, to strike printing platen 63 for the purpose of printing the quotient excess-capacity symbol upon the paper document.

The platen 63 is mounted for rotation about a shaft 64 for the purpose of advancing the paper document in any well-known manner. The actual printing operation is controlled by a computer interlock circuit (not shown) which causes the release of locking members 92 and 92*a* at the initiation of a printing portion of the entire computing cycle so that the printing hammer 62 may be released so as to print the symbol indicative of a capacity-exceeding condition which has occurred during the computer dividing operation. The capacity-excess lever is "set" as described above to cause the printing of an excess symbol just prior to the initiation of the printing cycle.

During the printing operation, the incorrect quotient which has been thus far generated in the computer mechanism is printed upon the paper document. During the quotient imprinting operation, a reciprocating member 65, shown in dotted fashion in FIGURE 3, is moved vertically downward in the direction shown by arrow 93 under control of the printing actuating mechanism (not shown), causing the shaft 67 mounted thereto to likewise move vertically downward. The storage gears 66 secured to shaft 67 likewise move in the downward vertical direction, causing them to come into engagement with cog racks 1, so that the value stored in the quotient register mechanism is transferred to the cog racks by means of the engagement between storage gears 66 and the cog racks 1.

Simultaneously therewith, shaft 33, which is also secured to reciprocating member 65, moves in the downward vertical direction, causing lifting cam 34 secured to shaft 33 to move vertically downward to a position below that of the lower edge 36*b* of slidable member 36, which position is the starting position for the lifting cam 34.

The shaft 37 is also mounted to reciprocating member 65, and, likewise, experiences translational movement in the downward vertical direction. This movement is transferred to switch lever member 40, and further to the pin 41 attached to lever member 40, causing pin 41 to slidably engage the diagonally oriented surface 68 provided on switch ratchet member 50. The slidable engagement of pin 41 with surface 68 causes switch ratchet 50 to rotate clockwise about its pivot point 88 in the direction shown by arrow 95, causing flange 52 to move to a position above the notch 53. When in this position, the connecting bar 49 comes under the control of spring member 51, causing connecting bar 49 to move in the direction shown by arrow 96, which longitudinal movement is permitted due to the lost-motion linkage provided for by means of the elongated slot 49*a* and the shaft 88 extending through slot 49*a*. Thus, connecting bar 49 rapidly returns to its starting position which likewise causes angle lever 54 to return to its starting position in readiness for subsequent division operations of the computer. The reciprocating movement of member 65 is not impeded by the slidable member 36 due to the pin 99 which is connected to member 65 and extends through opening 36*c* in member 36. The shaft 99 and opening 36*c*, however, serve to maintain the member 36 substantially in vertical alignment, thus insuring successful operation of the mechanism.

Thus, it can be seen that this invention provides a novel structure for indicating the capacity-exceeding condition which may occur during a division operation, and which further initiates printing of the divisor, the quotient formed up to the time that the indication has occurred, and, simultaneously therewith, the printing of a symbol indicative of the fact that the machine quotient capacity has been exceeded.

Although this invention has been described with respect to its preferred embodiments it should be understood that many variations and modifications will now be obvious to those skilled in the art, and it is preferred, therefore, that the scope of this invention be limited not by the specific disclosure herein but only by the appended claims.

What is claimed is:

1. For use in computers capable of performing addition, subtraction, multiplication and division operations, means for indicating the exceeding of machine computational capacity comprising first means rotatable in unison with, and under control of, the computer computational facility; printing means including means for printing a symbol indicative of machine capacity-exceeding condition; pivotally mounted reciprocating means biased in a first direction, said reciprocating means being positioned adjacent said first means; said first means having a rotating lever arm for lifting said reciprocating means substantially linearly in a direction opposite said first direction when said computer computational facility moves by an amount greater than the computer computational capacity; connecting means linked between said reciprocating means and said printing means and adapted to condition said printing means to initiate printing of said capacity-exceeding symbol when said reciprocating means is moved in the direction opposite said first direction; second reciprocating means controllable upon initiation of the printing operation for linearly moving said first means in said first direction without disturbing the angular position of said lever arm, thereby permitting the first reciprocating means to move to its first position under control of the bias means.

2. For use in computers capable of performing addition, subtraction, multiplication and division operations, means for indicating the exceeding of machine computational capacity comprising first means rotatable in unison with, and under control of, the computer computational facility; printing means including means for printing a symbol indicative of machine capacity-exceeding condition; reciprocating means biased in a first direction, said reciprocating means being positioned adjacent said first means; said first means being adapted to move said reciprocating means in a direction opposite said first direction when said computer computational facility moves by an amount greater than the computer computational capacity; connecting means linked between said reciprocating means and said printing means and adapted to condition said printing means to initiate printing of said capacity-exceeding symbol when said reciprocating means is moved in the direction opposite said first direction; second reciprocating means controllable upon initiation of the printing operation for resetting the movable means without disturbing the first reciprocating means, thereby permitting the first reciprocating means to move to its first position under control of the bias means; said movable means comprising a rotatable shaft; gear means secured to said shaft and rotatable under control of said computer computational facility; a lifting cam mounted on said shaft a spaced longitudinal distance from said gear means and positioned to slidably engage said first reciprocating means.

3. For use in computers capable of performing addition, substraction, multiplication and division operations, means for indicating the exceeding of machine computational capacity comprising first means rotatable in unison with, and under control of, the computer computational facility; printing means including means for printing a symbol indicative of machine capacity-exceeding condition; reciprocating means biased in a first direction, said reciprocating means being positioned adjacent said first means; said first means being adapted to move said reciprocating means in a direction opposite said first direction when said computer computational facility moves by an amount greater than the computer computational capacity; connecting means linked between said reciprocating means and said printing means and adapted to condition said printing means to initiate printing of said capacity-exceeding symbol when said reciprocating means is moved in the direction opposite said first direction; second reciprocating means controllable upon initiation of the printing operation for resetting the movable means without disturbing the first reciprocating means, thereby permitting the first reciprocating means to move to its first position under control of the bias means; said movable means comprising a rotatable shaft; gear means secured to said shaft and rotatable under control of said computer computational facility; a lifting cam mounted on said shaft a spaced longitudinal distance from said gear means and positioned to slidably engage said first reciprocating means; said first reciprocating means being comprised of a pivotally mounted slidable member; a lever assembly linked to said pivotally mounted slidable member; said lever assembly having a biasing means connected to said slidable member for urging said member against said lifting cam; said lever assembly being adapted to urge said connecting means in a first direction when said slidable member is lifted under control of said lifting cam.

4. For use in computers capable of performing addition, subtraction, multiplication and division operations, means for indicating the exceeding of machine computational capacity comprising first means rotatable in unison with, and under control of, the computer computational facility; printing means including means for printing a symbol indicative of machine capacity-exceeding condition; reciprocating means biased in a first direction, said reciprocating means being positioned adjacent said first means; said first means being adapted to move said reciprocating means in a direction opposite said first direction when said computer computational facility moves by an amount greater than the computer computational capacity; connecting means linked between said reciprocating means and said printing means and adapted to condition said printing means to initiate printing of said capacity-exceeding symbol when said reciprocating means is moved in the direction opposite said first direction; second reciprocating means controllable upon initiation of the printing operation for resetting the movable means without disturbing the first reciprocating means, thereby permitting the first reciprocating means to move to its first position under control of the bias means; said movable means comprising a rotatable shaft; gear means secured to said shaft and rotatable under control of said computer computational facility; a lifting cam mounted on said shaft a spaced longitudinal distance from said gear means and positioned to slidably engage said first reciprocating means; said first reciprocating means being comprised of a pivotally mounted slidable member; a lever assembly linked to said pivotally mounted slidable member; said lever assembly having a biasing means connected to said slidable member for urging said member against said lifting cam; said lever assembly being adapted to urge said connecting means in a first direction when said slidable member is lifted under control of said lifting cam; pivotally mounted locking means; second bias means connected between the free end of said locking means and said connecting means comprising a connecting bar for urging said connecting bar in a second direction opposite said first direction, said locking bar being notched, said connecting bar having a flanged portion positioned in close proximity to said notch, said flanged portion being adapted to abut said notch when said connecting bar is moved in said first direction, said locking member notched portion being adapted to restrain said connecting bar from any further movement for a period of time sufficient for said connecting bar to initiate printing of said excess-capacity symbol during the computer printing operation.

5. For use in computers capable of performing addition, subtraction, multiplication and division operations, means for indicating the exceeding of machine computational capacity comprising first means rotatable in unison with, and under control of, the computer computational facility; printing means including means for printing a symbol indicative of machine capacity-exceeding condition; reciprocating means biased in a first direction, said reciprocating means being positioned adjacent said first means; said first means being adapted to move said reciprocating means in a direction opposite said first direction when said computer computational facility moves by an amount greater than the computer computational capacity; connecting means linked between said reciprocating means and said printing means and adapted to condition said printing means to initiate printing of said capacity-exceeding symbol when said reciprocating means is moved in the direction opposite said first direction; second reciprocating means controllable upon initiation of the printing operation for resetting the movable means without disturbing the first reciprocating means, thereby permitting the first reciprocating means to move to its first position under control of the bias means; said movable means comprising a rotatable shaft; gear means secured to said shaft and rotatable under control of said computer computational facility; a lifting cam mounted on said shaft a spaced longitudinal distance from said gear means and positioned to slidably engage said first reciprocating means; said first reciprocating means being comprised of a pivotally mounted slidable member; a lever assembly linked to said pivotally mounted slidable member; said lever assembly having a biasing means connected to said slidable member for urging said member against said lifting cam; said lever assembly being adapted to urge said connecting means in a first direction when said slidable member is lifted under control of said lifting cam; pivotally mounted locking means; second bias means connected between the free end of said locking means and said connecting means comprising a connecting bar for urging said connecting bar in a second direction opposite said first direction, said locking bar being notched, said connecting bar having a flanged portion positioned in close proximity to said notch, said flanged portion being adapted to abut said notch when said connecting bar is moved in said first direction, said locking member notched portion being adapted to restrain said connecting bar from any further movement for a period of time sufficient for said connecting bar to initiate printing of said excess-capacity symbol during the computer printing operation; said second reciprocating means being adapted to move said lifting cam out of engagement with said slidable member; said lever assembly being coupled to said second reciprocating member and being adapted to pivot said locking member under control thereof, the pivoting movement of said locking member being adapted to free said flanged portion of said connecting bar; said second bias means adapted to urge said connecting bar in said second direction when said connecting bar flanged portion is freed from said notch, thereby placing the machine excess-capacity identifying means in its starting position in readiness for the next machine computational operation.

References Cited in the file of this patent

UNITED STATES PATENTS

| | | |
|---|---|---|
| 1,115,889 | Benner | Nov. 3, 1914 |
| 2,984,412 | Sundstrand | May 16, 1961 |